US008237698B2

(12) United States Patent
Yamamoto et al.

(10) Patent No.: US 8,237,698 B2
(45) Date of Patent: Aug. 7, 2012

(54) PANEL AND DRIVING CONTROLLING METHOD

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 12/379,449

(22) Filed: Feb. 23, 2009

(65) Prior Publication Data

US 2009/0244049 A1 Oct. 1, 2009

(30) Foreign Application Priority Data

Mar. 31, 2008 (JP) ................................ 2008-092184

(51) Int. Cl.
*G06F 3/038* (2006.01)

(52) U.S. Cl. ....................................... 345/212; 345/213

(58) Field of Classification Search .................... 345/77, 345/690
See application file for complete search history.

(56) References Cited

U.S. PATENT DOCUMENTS

2008/0246785 A1* 10/2008 Shirasaki et al. ............. 345/690
2009/0251493 A1* 10/2009 Uchino et al. ................ 345/690

FOREIGN PATENT DOCUMENTS

| | | | |
|---|---|---|---|
| JP | 2000-122596 | A | 4/2000 |
| JP | 2001-060076 | A | 3/2001 |
| JP | 2002-091376 | A | 3/2002 |
| JP | 2003-202834 | A | 7/2003 |
| JP | 2003-223138 | A | 8/2003 |
| JP | 2003-255856 | | 9/2003 |
| JP | 2003-271095 | | 9/2003 |
| JP | 2003-288049 | A | 10/2003 |
| JP | 2004-029791 | | 1/2004 |
| JP | 2004-070294 | A | 3/2004 |
| JP | 2004-093682 | | 3/2004 |
| JP | 2004-133240 | | 4/2004 |
| JP | 2006-133731 | A | 5/2006 |
| JP | 2007-133282 | A | 5/2007 |
| JP | 2008-033193 | A | 2/2008 |
| JP | 2008-033194 | A | 2/2008 |
| JP | 2009-237041 | A | 10/2009 |
| JP | 2009-244666 | A | 10/2009 |
| WO | WO 2007055376 | A1 * | 5/2007 |

OTHER PUBLICATIONS

Japanese Office Action issued May 10, 2011 for corresponding Japanese Application No. 2008-092184.
Japanese Office Action issued Mar. 16, 2010 for corresponding Japanese Application No. 2008-092184.

* cited by examiner

*Primary Examiner* — Adam R Giesy
(74) *Attorney, Agent, or Firm* — Rader Fishman & Grauer, PLLC

(57) ABSTRACT

The present invention provides a panel, including: a plurality of pixel circuits disposed in rows and columns and each including a light emitting element for emitting light in response to driving current, a sampling transistor for sampling an image signal, a driving transistor for supplying the driving current to the light emitting element, and a storage capacitor for storing a predetermined potential; a power supplying section configured to supply a predetermined power supply voltage to the pixel circuits disposed in rows and columns; and a power supply line for connecting all of the pixel circuits disposed in rows and columns and the power supply section to each other.

9 Claims, 15 Drawing Sheets

PANEL AND DRIVING CONTROLLING METHOD

BACKGROUND OF THE INVENTION

1. Field of the Invention

This invention relates to a panel and a driving controlling method, and more particularly to a technique for reduction of the cost of a panel.

2. Description of the Related Art

In recent years, development of a panel or EL (Electro Luminescent) panel of the planar self-luminous type which uses an organic EL device as a light emitting element is proceeding energetically. The organic EL device utilizes a phenomenon that, if an electric field is applied to an organic thin film, then the organic thin film emits light. Since the organic EL device is driven by an application voltage lower than 10 V, the power consumption is low. Further, since the organic EL device is a self-luminous device which itself emits light, it requires no illuminating member and can be formed as a device of a reduced weight and a reduced thickness. Further, since the response speed of the organic EL device is as high as approximately several μs, an after-image upon display of a dynamic picture does not appear.

Among panels of the flat self-luminous type wherein an organic EL device is used in a pixel, a panel of the active matrix type wherein thin film transistors as active elements are formed in an integrated relationship in pixels is being developed energetically. A flat self-luminous panel of the active matrix type is disclosed, for example, in Japanese Patent Laid-Open Nos. 2003-255856, 2003-271095, 2004-133240, 2004-029791 and 2004-093682.

SUMMARY OF THE INVENTION

However, in comparison with a liquid crystal display (LCD) apparatus which has been popularized heretofore, further reduction in cost is demanded for a panel of the planar self-luminance type wherein an organic EL device is used in a pixel.

Therefore, it is desirable to provide a panel and a driving control method by which further reduction in cost can be achieved.

According to an embodiment of the present invention, there is provided a panel including a plurality of pixel circuits disposed in rows and columns and each including a light emitting element for emitting light in response to driving current, a sampling transistor for sampling an image signal, a driving transistor for supplying the driving current to the light emitting element, and a storage capacitor for storing a predetermined potential, a power supplying section configured to supply a predetermined power supply voltage to the pixel circuits disposed in rows and columns, and a power supply line for connecting all of the pixel circuits disposed in rows and columns and the power supply section to each other, the power supplying section carrying out the same power supply voltage control for all of the pixel circuits disposed in rows and columns in order to carry out a threshold value correction preparation operation and a threshold value correction operation simultaneously for all of the pixel circuits disposed in rows and columns within a vertical blanking period.

Preferably, the panel further includes a scanning controlling section configured to turn on or off the sampling transistor in the pixel circuits to control the light emitting period of the light emitting element.

According to another embodiment of the present invention, there is provided a driving controlling method for a panel which includes a plurality of pixel circuits disposed in rows and columns and each including a light emitting element for emitting light in response to driving current, a sampling transistor for sampling an image signal, a driving transistor for supplying the driving current to the light emitting element, and a storage capacitor for storing a predetermined potential, including the step of carrying out the same power supply voltage control for all of the pixel circuits through a common power supply line connected to all of the pixel circuits in order to carry out a threshold value correction preparation operation and a threshold value correction operation simultaneously for all of the pixel circuits disposed in rows and columns within a vertical blanking period.

In the panel and the driving controlling method, the same power supply voltage control is carried out for all of the pixel circuits through the common power supply line connected to all of the pixel circuits in order to carry out the threshold value correction preparation operation and the threshold value correction operation simultaneously for all of the pixel circuits disposed in rows and columns within a vertical blanking period.

With the panel and the driving controlling method, reduction in cost can be achieved.

Further, with the panel and the driving controlling method, the life of the light emitting period can be extended.

DETAILED DESCRIPTION OF THE PREFERRED EMBODIMENT

Figure 1:
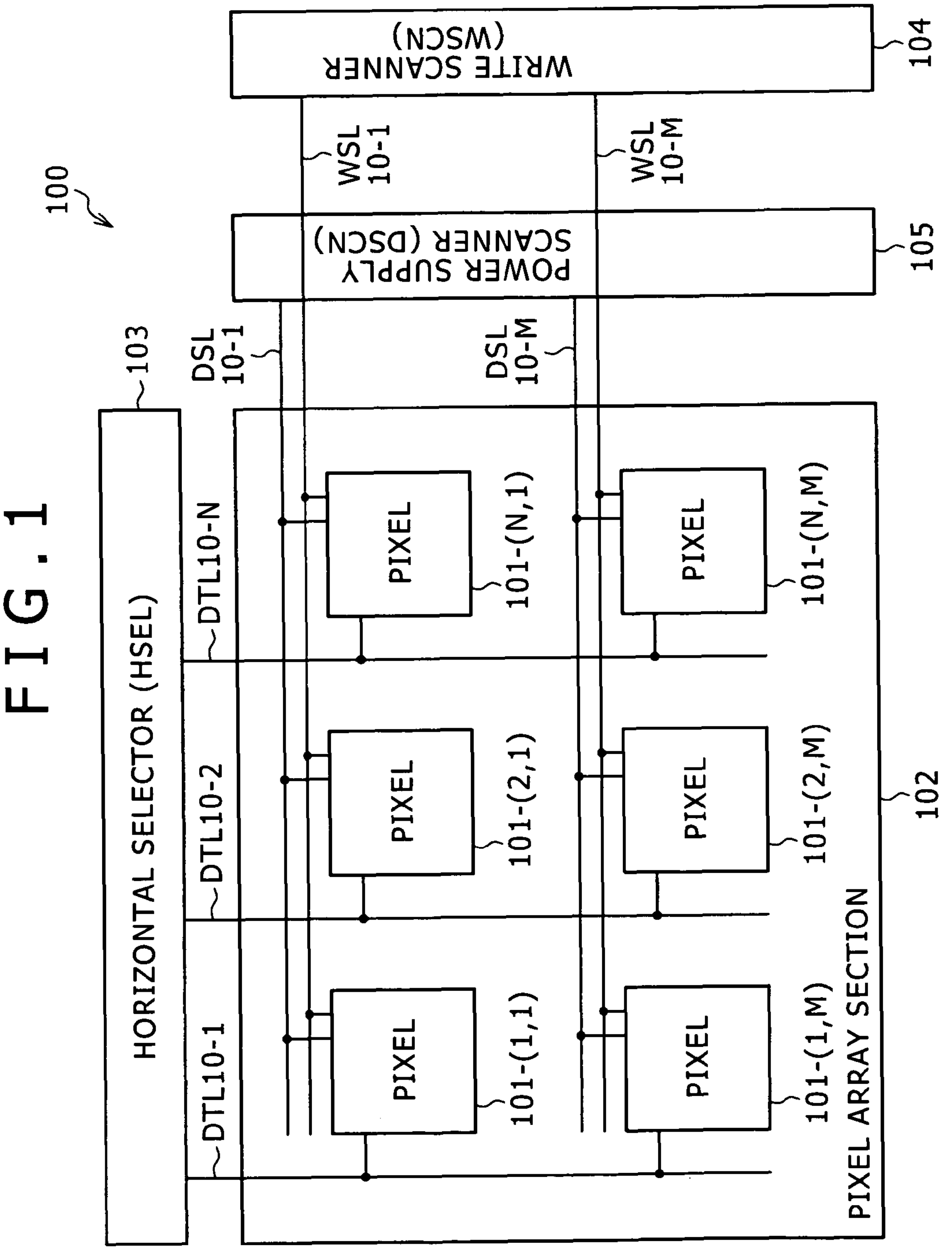
FIG. 1 is a block diagram showing an example of a basic configuration of an EL panel.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims and the drawings are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided a panel (for example, an EL panel 200 of FIG. 16) including a plurality of pixel circuits (for example, pixels 101*c* of FIG. 5) disposed in rows and columns and each including a light emitting element (for example, a light emitting element 34 of FIG. 5) for emitting light in response to driving current, a sampling transistor (for example, a sampling transistor of FIG. 5) for sampling an image signal, a driving transistor (for example, a driving transistor 32 of FIG. 5) for supplying the driving current to the light emitting element, and a storage capacitor (for example, a storage capacitor 33 of FIG. 5) for storing a predetermined potential, a power supplying section (for example, a power supply section 211 of FIG. 16) configured to supply a predetermined power supply voltage to the pixel circuits disposed in rows and columns, and a power supply line (for example, a power supply line DSL212 of FIG. 16) for connecting all of the pixel circuits disposed in rows and columns and the power supply section to each other, the power supplying section carrying out the same power supply voltage control for all of the pixel circuits disposed in rows and columns in order to carry out a threshold value correction preparation operation and a threshold value correction operation simultaneously for all of the pixel circuits disposed in rows and columns within a vertical blanking period.

In the following, a preferred embodiment of the present invention is described with reference to the accompanying drawings.

First, in order to facilitate understandings of the present invention and make the background of the present invention clear, a basic configuration and basic operation of a panel which uses an organic EL device are described with reference to FIGS. 1 to 15. It is to be noted that the panel which uses an organic EL device is hereinafter referred to as EL panel.

FIG. 1 shows an example of a basic configuration of an EL panel.

Referring to FIG. 1, the EL panel 100 shown includes a pixel array section 102 in which N×M pixels or pixel circuits 101-(1,1) to 101-(N,M) are disposed in a matrix, and a horizontal selector (HSEL) 103, a write scanner (WSCN) 104 and a power supply scanner (DSCN) 105 for driving the pixel array section 102.

Further, the EL panel 100 includes M scanning lines WSL10-1 to WLS10-M, M power supply lines DSL10-1 to DSL10-M and N image signal lines DTL10-1 to DTL10-N.

It is to be noted that, in the following description, where there is no necessity to particularly distinguish the scanning lines WSL10-1 to WLS10-M, image signal lines DTL10-1 to DTL10-N, pixels 101-(1,1) to 101-(N,M) or power supply lines DSL10-1 to DSL10-M from each other, they are referred to simply as scanning lines WSL10, image signal lines DTL10, pixels 101 or power supply lines DSL10.

The pixels 101-(1,1) to 101(N,1) in the first row of the pixels 101-(1,1) to 101-(N,M) are connected to the write scanner 104 and the power supply scanner 105 by the scanning line WSL10-1 and the power supply line DSL10-1, respectively. Meanwhile, the pixels 101-(1,M) to 101-(N,M) in the Mth row of the pixels 101-(1,1) to 101-(N,M) are connected to the write scanner 104 and the power supply scanner 105 by the scanning line WSL10-M and the power supply line DSL10-M, respectively. This similarly applies also to the other pixels 101 juxtaposed in the direction along a row among the pixels 101-(1,1) to 101-(N,M).

Meanwhile, the pixels 101-(1,1) to 101-(1,M) in the first column of the pixels 101-(1,1) to 101-(N,M) are connected to the horizontal selector 103 by the image signal line DTL10-1. The 101-(1,1) to 101-(N,M) in the Nth row of the pixels 101-(N,1) to 101-(N,M) the pixels are connected to the horizontal selector 103 by the image signal line DTL10-N. This similarly applied also to the other pixels 101 juxtaposed in the direction of a column among the pixels 101-(1,1) to 101-(N, M).

The write scanner 104 supplies a sequential controlling signal to the scanning lines WSL10-1 to WSL10-M within a horizontal period of 1H to line-sequentially scan the pixels 101 in a unit of a row. The power supply scanner 105 supplies a power supply voltage of a first potential (Vcc hereinafter described) or a second potential (Vss hereinafter described) to the power supply lines DSL10-1 to DSL10-M in synchronism with the line-sequential canning. The horizontal selector 103 carries out changeover between a signal potential Vsig which is an image signal and a reference potential Vofs within each horizontal period of 1H in synchronism with the line-sequential scanning to supply the signal potential Vsig or the reference potential Vofs to the image signal lines DTL10-1 to DTL10-M in the columns.

A driver IC (Integrated Circuit) including a source driver and a gate driver is added to the EL panel 100 having such a configuration as described above with reference to FIG. 1 to form a panel module. Further, a power supply circuit, an image LSI (Large Scale Integrated) circuit and so forth are added to the panel module to form the display apparatus. The display apparatus including the EL panel 100 can be used as a display section, for example, of a portable telephone set, a digital still camera, a digital video camera, a television receiver, a printer or the like.

Figure 2:
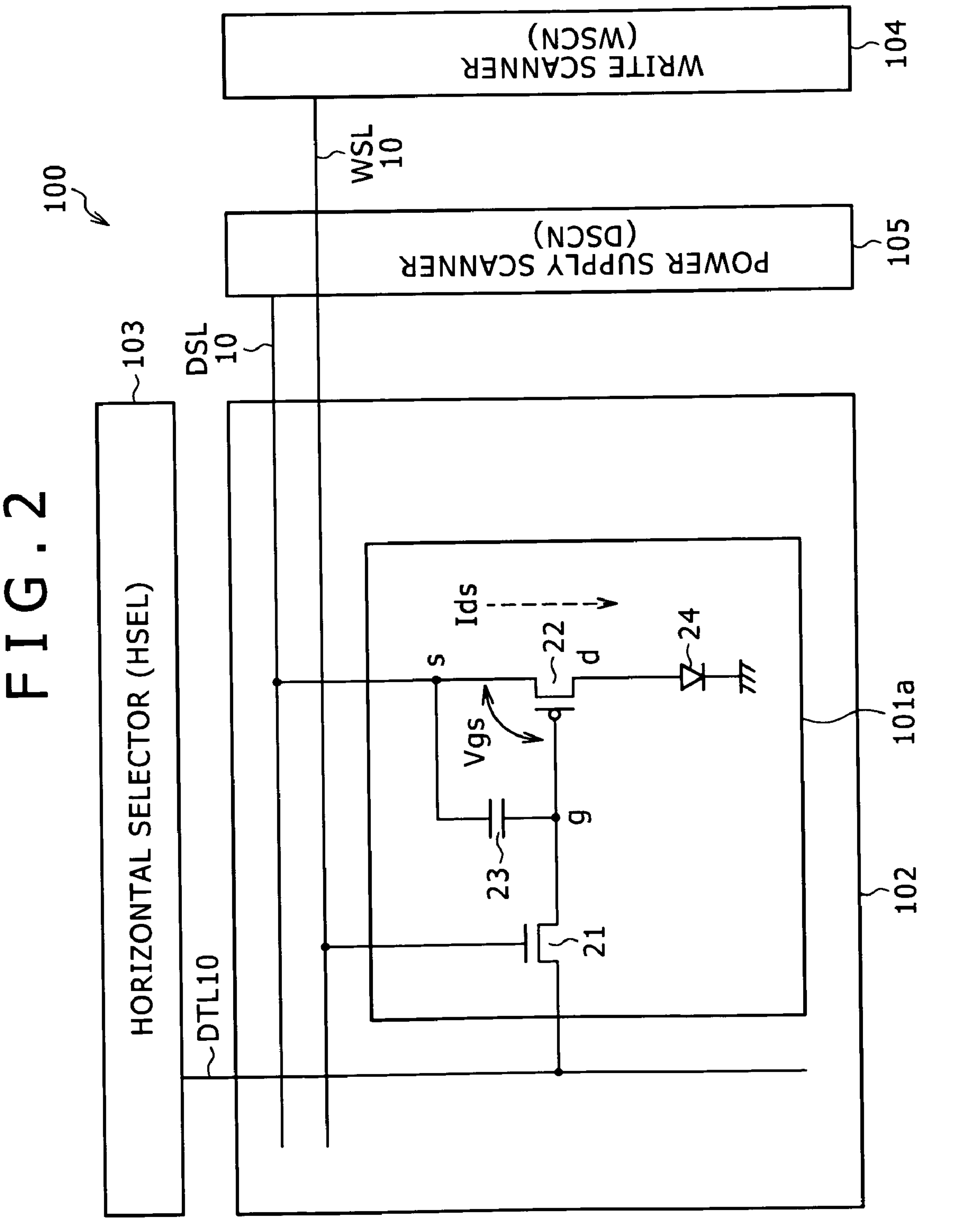
FIG. 2 is a block diagram showing an example of an existing configuration of a pixel.

FIG. 2 shows one of the N×M pixels 101 included in the EL panel 100 shown in FIG. 1 in an enlarged scale to show a detailed configuration of the pixel 101.

It is to be noted that a scanning line WSL10, an image signal line DTL10 and a power supply line DSL10 connected to the pixel 101 in FIG. 2 correspond to a scanning line WSL10-(*n*,*m*), an image signal line DTL10-(*n*,*m*) and a power supply line DSL10-(*n*,m) for a pixel 101-(*n*,*m*) (n=1, 2, . . . , N, m=1, 2, . . . , M), respectively, as apparently seen from FIG. 1.

The configuration of the pixel 101 shown in FIG. 2 is used configuration in related art, and a pixel 101 having this configuration is hereinafter referred to as pixel 101*a*.

Referring to FIG. 2, the pixel 101*a* includes a sampling transistor 21, a driving transistor 22, a storage capacitor 23 and a light emitting element 24 in the form of an organic EL element. Here, the sampling transistor 21 is an N-channel transistor while the driving transistor 22 is a P-channel transistor. The sampling transistor 21 is connected at the gate thereof to the scanning line WSL10, at the drain thereof to the image signal line DTL10 and at the source thereof to the gate g of the driving transistor 22.

The driving transistor 22 is connected at the source s thereof to the power supply line DSL10 and at the drain d thereof to the anode of the light emitting element 24. The storage capacitor 23 is connected between the source s and the gate g of the driving transistor 22. The light emitting element 24 is grounded at the cathode thereof.

Since an organic EL element is a current light emitting element, a gradation of light emission can be obtained by controlling the amount of current to flow through the light emitting element 24. In the pixel 101*a* of FIG. 2, the amount of current to flow through the light emitting element 24 is controlled by varying the application voltage to the gate of the driving transistor 22.

More particularly, the driving transistor 22 is connected at the source s thereof to the power supply line DSL10 and is designed so as to normally operate in a saturation region. Therefore, the driving transistor 22 functions as a constant current source which supplies current Ids of a value represented by the following expression (1):

$$Ids = \frac{1}{2}\mu\frac{W}{L}Cox(Vgs - Vth)^2 \quad (1)$$

where μ is the mobility, W the gate width, L the gate length, Cox the gate oxide film capacitance per unit area, Vgs the voltage between the gate g and the source s of the driving transistor 22, that is, the gate-source voltage of the driving transistor 22, and Vth the threshold voltage of the driving transistor 22. It is to be noted that the saturation region is a region in which the condition of Vgs−Vth<Vds is satisfied, where Vds is the voltage between the source s and the drain d of the driving transistor 22.

Figure 3:
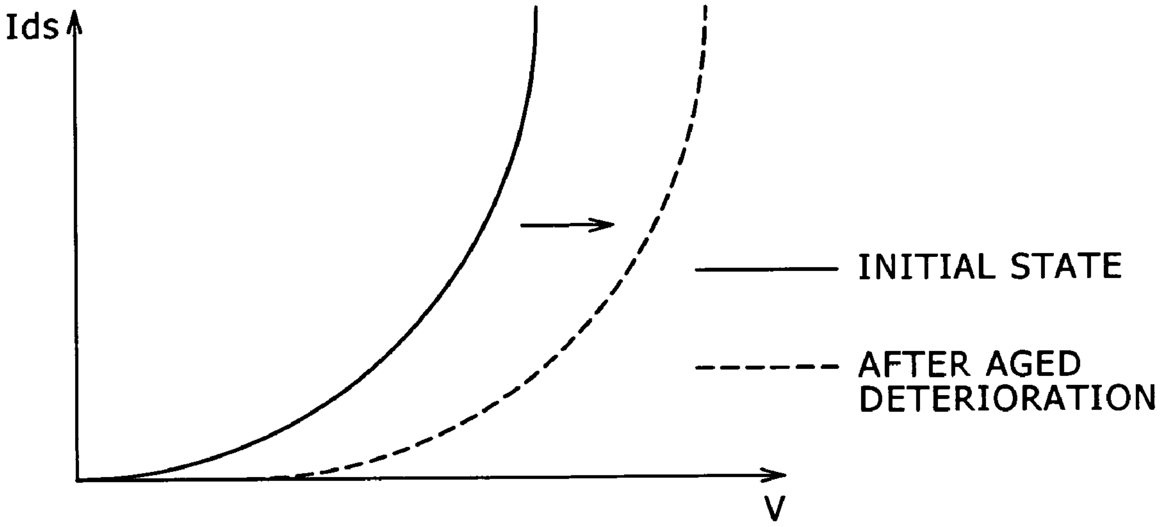
FIG. 3 is a graph illustrating an I-V characteristic of an organic EL element.

In the pixel 101*a* of FIG. 2, when the organic EL element suffers from aged deterioration, the I-V characteristic thereof exhibits such a variation as illustrated in FIG. 3. Thus, although the drain voltage of the driving transistor 22 varies, if the gate-source voltage Vgs of the driving transistor 22 is kept fixed, then current Ids of a fixed amount flows through the light emitting element 24. In other words, since the current Ids and the luminance of emitted light of the organic EL element have a proportional relationship to each other, the luminance itself does not substantially vary irrespective of the aged deterioration.

However, since a P-channel transistor cannot be formed from amorphous silicon which can be produced at a lower cost than that of low temperature polycrystalline silicon, if it is intended to form a pixel circuit at a reduced cost, then the pixel circuit is preferably formed using an N-channel transistor.

Figure 4:
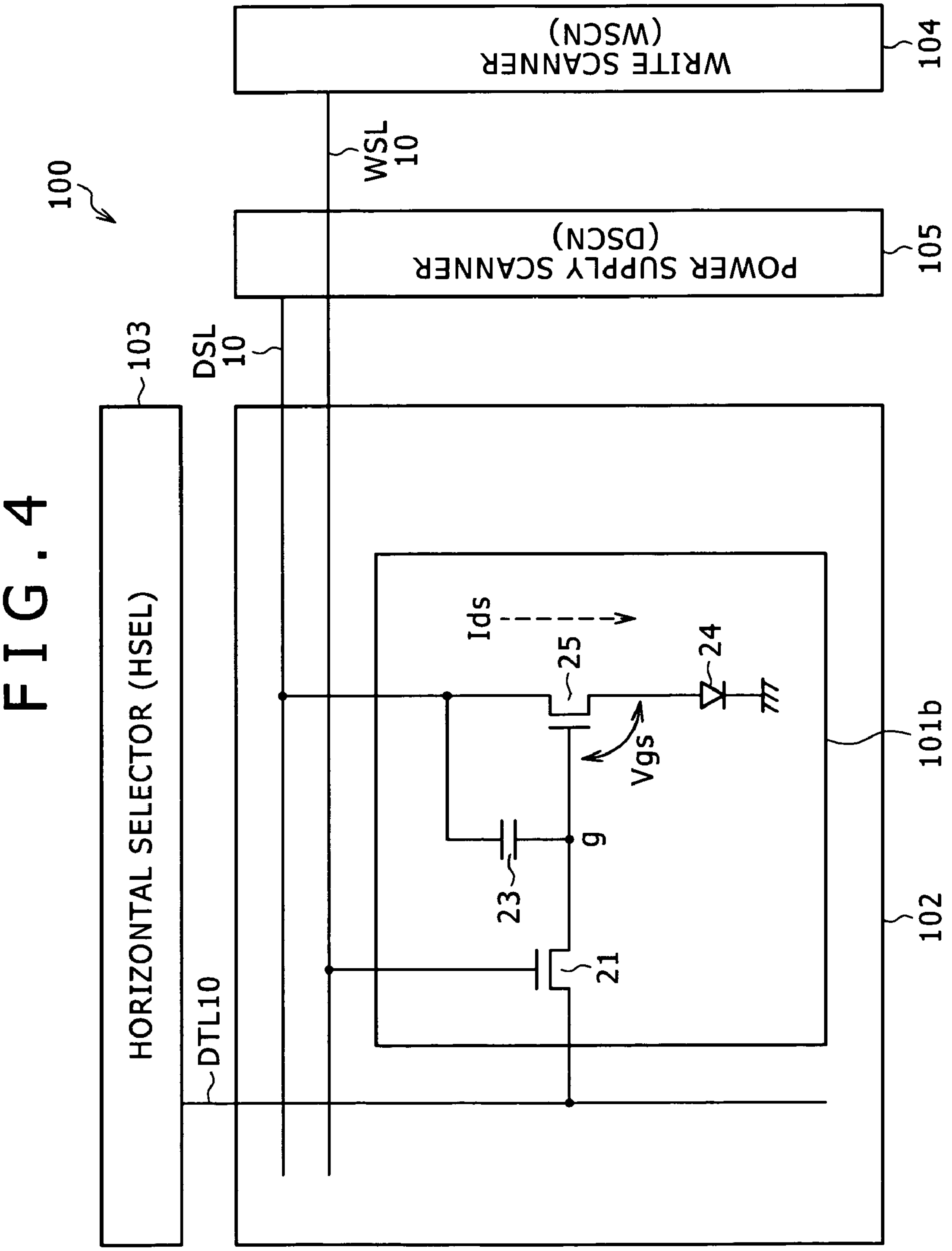
FIG. 4 is a block diagram showing another example of an existing configuration of a pixel.

Therefore, it seems a possible idea to replace the driving transistor 22 of the P-channel type with a driving transistor 25 of the N-channel type as in a pixel 101*b* shown in FIG. 4.

Referring to FIG. 4, the pixel 101*b* is configured such that, from among the components of the pixel 101*a* shown in FIG. 1, the P-channel driving transistor 22 is replaced by the N-channel driving transistor 25.

In the configuration of the pixel 101*b* of FIG. 4, since the driving transistor 25 is connected at the source s thereof to the light emitting element 24, the gate-source voltage Vgs of the driving transistor 25 varies together with the aged deterioration of the organic EL element. Consequently, the current flowing through the light emitting element 24 varies, resulting in variation of the luminance of emitted light. Further since the threshold voltage Vth and the mobility μ differ among different pixels 101*b*, dispersion occurs with the current Ids in accordance with the expression (1) and also the luminance of emitted light differs among different pixels.

Therefore, a configuration of a pixel 101*c* shown in FIG. 5 which is adopted also in an EL panel hereinafter described to which an embodiment of the present invention is applied has been proposed, by the assignee of the present patent application, as a circuit which prevents the aged deterioration of an organic EL element and dispersion of driving transistors and besides includes pixels formed from a comparatively small number of elements.

Figure 5:
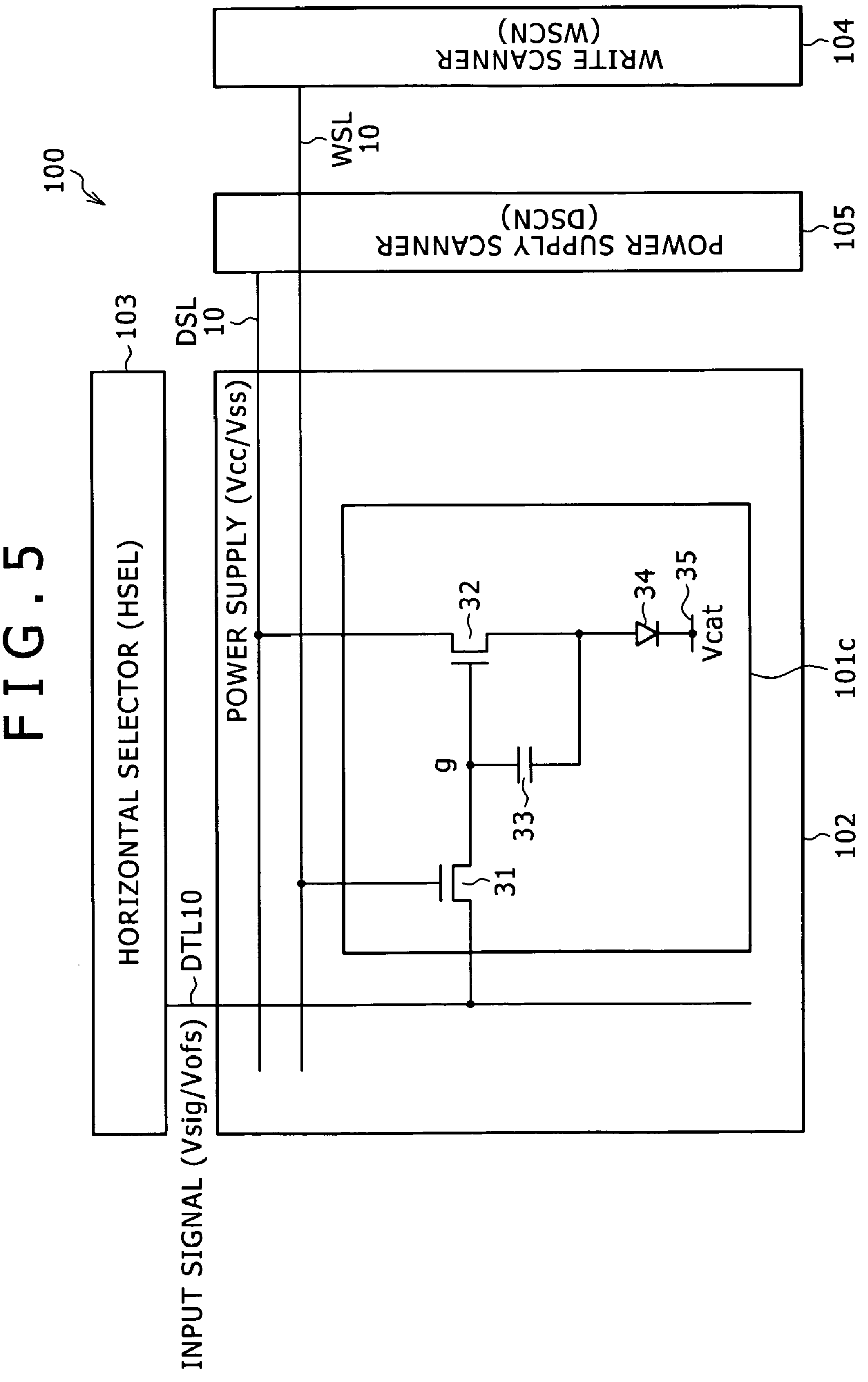
FIG. 5 is a block diagram showing an example of a configuration of a pixel adopted in an EL panel to which the present invention is applied.

Referring to FIG. 5, the pixel 101*c* includes a sampling transistor 31, a driving transistor 32, a storage capacitor 33 and a light emitting element 34. The sampling transistor 31 is connected at the gate thereof to a scanning line WSL10, at the drain thereof to an image signal line DTL10, and at the source thereof to the gate g of the driving transistor 32.

The driving transistor 32 is connected at one of the source s and the drain d thereof to the anode of the light emitting element 34 and at the other one of the source s and the drain d to the power supply line DSL10. The storage capacitor 33 is connected between the gate g of the driving transistor 32 and the anode of the light emitting element 34. The light emitting element 34 is connected at the cathode thereof to a wiring line 35 which is set to a predetermined potential Vcat.

In the pixel 101*c* having the configuration described above, if the sampling transistor 31 is turned on or rendered conducting in accordance with a control signal supplied thereto from the scanning line WSL10, then the storage capacitor 33 accumulates and stores charge supplied thereto from the horizontal selector 103 through the image signal line DTL10. The driving transistor 32 receives supply of current from the power supply line DSL10 having a first potential Vcc and supplies predetermined driving current Ids to the light emitting element 34 in response to the signal potential Vsig stored in the storage capacitor 33. When the predetermined driving current Ids flows through the light emitting element 34, the pixel 101*c* emits light.

The pixel 101*c* has a threshold value correction function. The threshold value correction function is a function of causing the storage capacitor 33 to store a voltage corresponding to the threshold voltage Vth of the driving transistor 32. By the threshold value correction function, the influence of the threshold voltage Vth of the driving transistor 32 which makes a cause of dispersion amount for each of the pixels of the EL panel 100 can be canceled.

The pixel 101*c* has a mobility correction function in addition to the threshold value correction function described above. The mobility correction function is a function of applying, when the signal potential Vsig is stored into the storage capacitor 33, correction regarding the mobility μ of the driving transistor 32 to the signal potential Vsig.

The pixel 101*c* further has a bootstrap function. The bootstrap function is a function of causing the gate-source voltage Vgs of the driving transistor 32 to interlock with the variation of the source potential Vs of the driving transistor 32. By the bootstrap function, the gate-source voltage Vgs between the gate g and the source s of the driving transistor 32 can be kept fixed.

Figure 14:
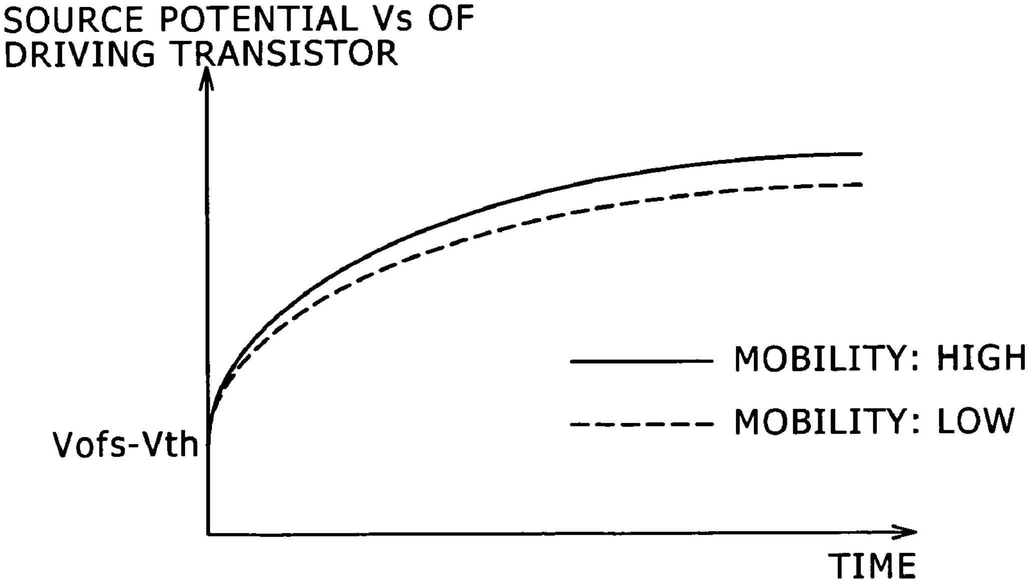
FIG. 14 is a graph illustrating a relationship among the source potential and the mobility of the driving transistor and the time.

It is to be noted that the threshold value correction function, mobility correction function and bootstrap function are hereinafter described with reference to FIGS. 10, 14 and 15.

It is assumed that, in the following description, even where a term pixel 101 is used, it has the configuration of the pixel 101*c* described hereinabove with reference to FIG. 5.

Figure 6:
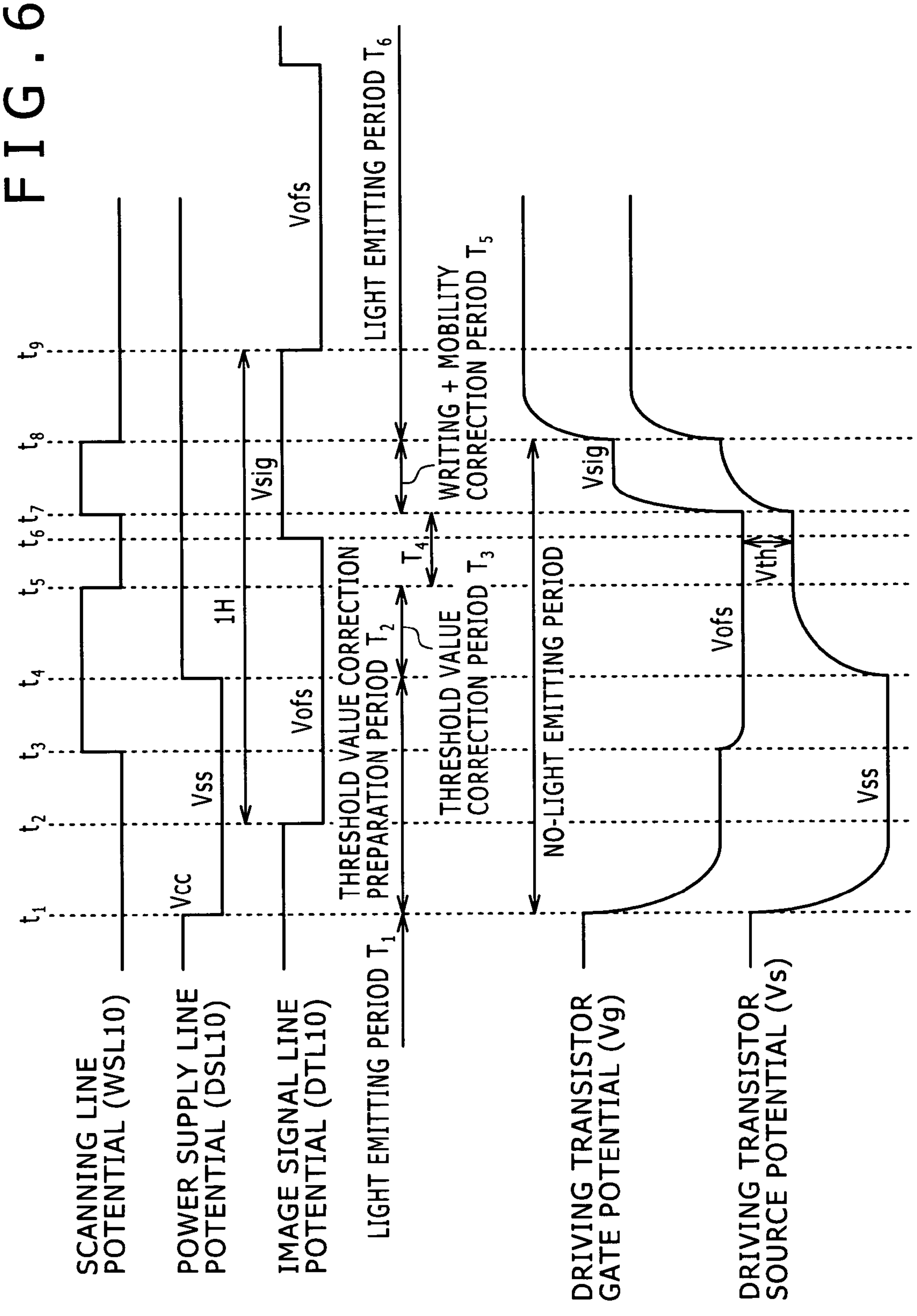
FIG. 6 is a timing chart illustrating operation of the pixel of FIG. 5.

FIG. 6 illustrates operation of the pixel 101.

In particular, FIG. 6 illustrates potential variations of the scanning line WSL10, power supply line DSL10 and image signal line DTL10 and corresponding variations of the gate potential Vg and the source potential Vs of the driving transistor 32 on the same time axis, that is, in the horizontal direction in FIG. 6.

Referring to FIG. 6, a period till time $t_1$ is light emitting period $T_1$ within which light is emitted for a preceding horizontal period of 1H.

A period from time $t_1$ to time $t_4$ at which the light emitting period $T_1$ ends is a threshold value correction preparation period $T_2$ within which the gate potential Vg and the source potential Vs of the driving transistor 32 are initialized to make preparations for a threshold voltage correction operation.

Within the threshold value correction preparation period $T_2$, the power supply scanner 105 changes over the potential of the power supply line DSL10 from the first potential Vcc which is the high potential to the second potential Vss which is the low potential at time $t_1$, and the horizontal selector 103 changes over the potential of the image signal line DTL10 from the signal potential Vsig to the reference potential Vofs at time $t_2$. Then at time $t_3$, the write scanner 104 changes over the potential of the scanning line WSL10 to the high potential to turn on the sampling transistor 31. Consequently, the gate potential Vg of the driving transistor 32 is reset to the reference potential Vofs and the source potential Vs is reset to the low potential Vss of the image signal line DTL10.

A period from time $t_4$ to time $t_5$ is a threshold value correction period $T_3$ within which a threshold value correction operation is carried out. Within the threshold value correction period $T_3$, the power supply scanner 105 changes over the potential of the power supply line DSL10 to the high potential Vcc and a voltage corresponding to the threshold voltage Vth is written into the storage capacitor 33 connected between the gate g and the source of the driving transistor 32 at time $t_4$.

Within a writing+mobility correction preparation period $T_4$ from time $t_5$ to time $t_7$, the potential of the scanning line WSL10 is changed over from the high potential to the low potential once, and at time $t_6$ prior to time $t_7$, the horizontal selector 103 changes over the potential of the image signal line DTL10 from the reference potential Vofs to the signal potential Vsig.

Then, within a writing+mobility correction period $T_5$ from time $t_7$ to time $t_8$, a writing operation of the image signal and a mobility correction operation are carried out. In particular, within a period from time $t_7$ to time $t_8$, the potential of the scanning line WSL10 is set to the high potential. Consequently, the signal potential Vsig of the image signal is written into the storage capacitor 33 in such a form as to be added to the threshold voltage Vth while a voltage $\Delta V_\mu$ for mobility correction is subtracted from the voltage stored in the storage capacitor 33.

At time $t_8$ after the writing+mobility correction period $T_5$ ends, the potential of the scanning line WSL10 is set to the low potential, and thereafter, the light emitting element 34 emits light with a luminance corresponding to the signal potential Vsig within a light emitting period $T_6$. Since the signal potential Vsig is adjusted with the voltage corresponding to the threshold voltage Vth and the voltage $\Delta V_\mu$ for mobility correction, the luminance of the emitted light of the light emitting element 34 is not influenced by the threshold voltage Vth of the driving transistor 32 or the dispersion of the mobility μ.

It is to be noted that, within the light emitting period $T_6$, a bootstrap operation is carried out first, and while the gate-source voltage Vgs of the driving transistor 32=Vsig+Vth−$\Delta V_\mu$ is kept, the gate potential Vg and the source potential Vs of the driving transistor 32 rise.

Further, at time $t_9$ after lapse of a predetermined interval of time after time $t_8$, the potential of the image signal line DTL10 is dropped from the signal potential Vsig to the reference potential Vofs. In FIG. 6, the period from time $t_2$ to time $t_9$ corresponds to a horizontal period of 1H.

In the EL panel 100 wherein the pixel 101 has the configuration of the pixel 101*c*, the light emitting element 34 can emit light without being influenced by the threshold voltage Vth or the mobility μ of the driving transistor 32 in such a manner as described above.

Now, operation of the pixel 101 (101*c*) is described in more detail with reference to FIGS. 7 to 15.

Figure 7:
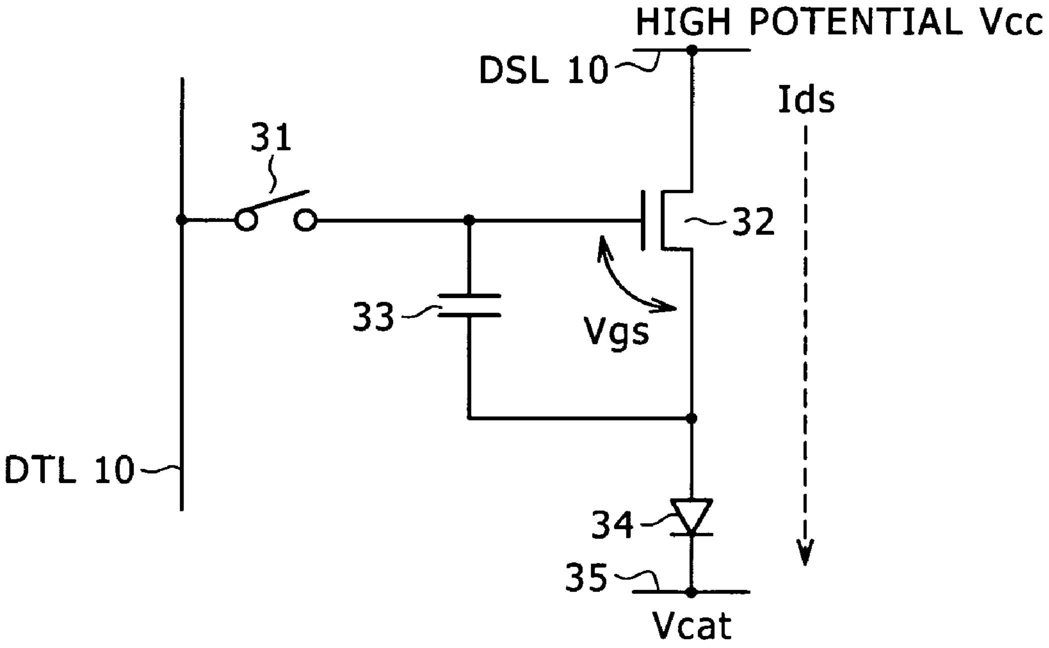
FIGS. 7 to 10 are circuit diagrams illustrating detailed operations in the operation of the pixel of FIG. 5 illustrated in FIG. 6.

FIG. 7 illustrates a state of the pixel 101 within the light emitting period $T_1$.

Within the light emitting period $T_1$, the sampling transistor 31 is in an off state because the potential of the scanning line WSL10 is the low potential, and the potential of the power supply line DSL10 is the high potential Vcc and the driving transistor 32 supplies current Ids to the light emitting element 34. At this time, since the driving transistor 32 is set so as to operate in a saturation region, the driving current Ids flowing through the light emitting element 34 assumes a value represented by the expression (1) given hereinabove in response to the gate-source voltage Vgs of the driving transistor 32.

Figure 8:
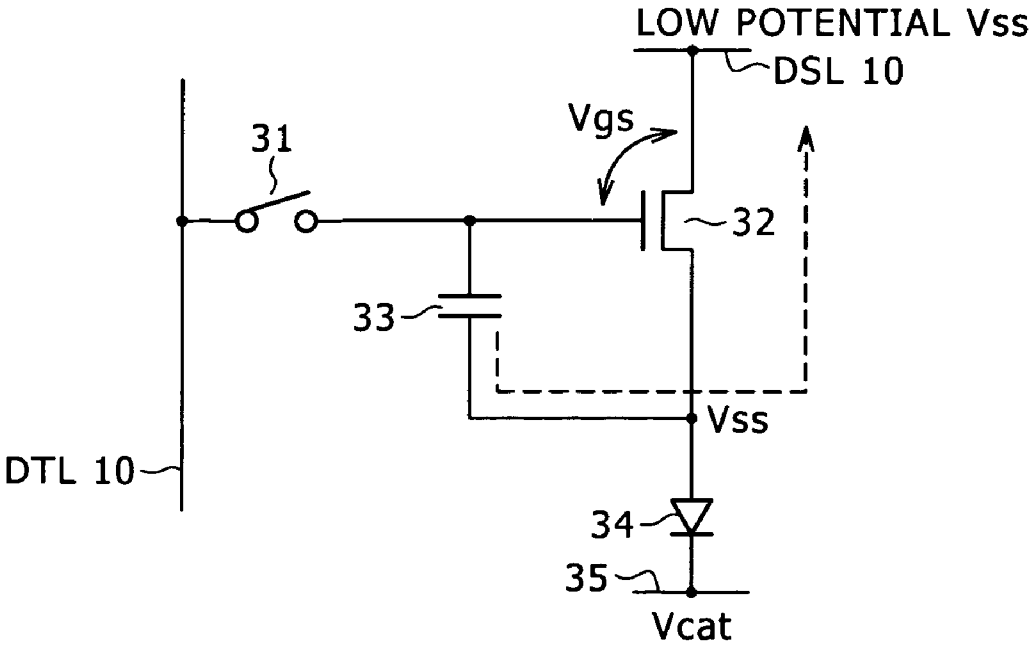
Figure 9:
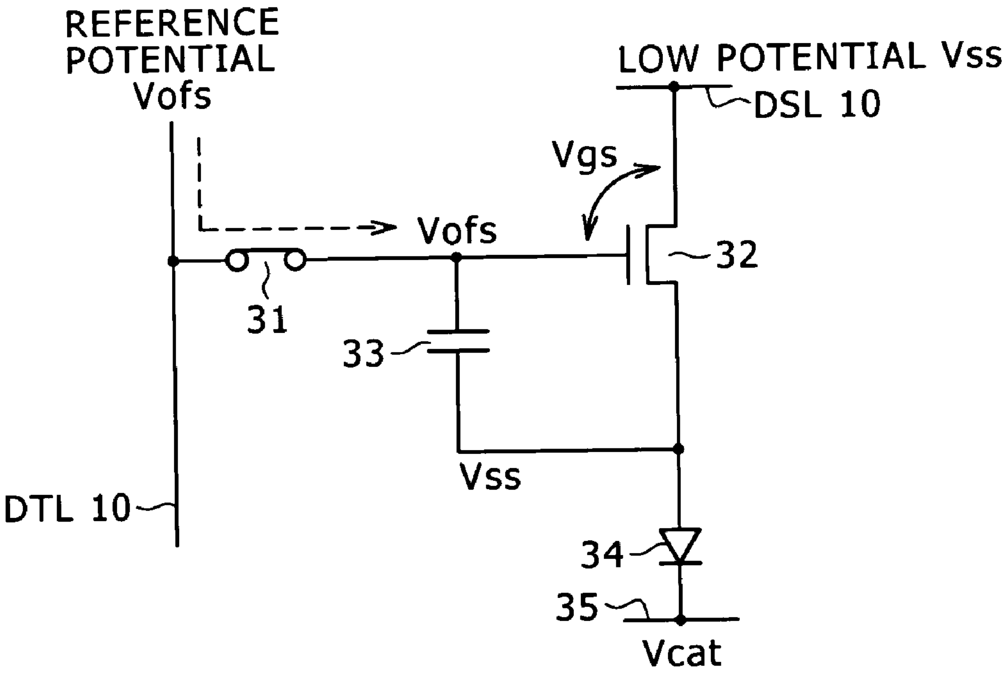

Then, at first time $t_1$ within the threshold value correction preparation period $T_2$, the power supply scanner 105 changes over the potential of the power supply line DSL10 from the high potential Vcc which is the first potential to the low potential Vss which is the second potential as seen in FIG. 8. At this time, if the second potential Vss of the power supply line DSL10 is lower than the sum of the threshold voltage Vthel and the potential Vcat of the light emitting element 34, that is, if Vss<Vthel+Vcat, then the light emitting element 34 stops the emission of light. Then, that one of the terminals of the driving transistor 32 which is connected to the power supply line DSL10 serves as the source s, and the anode of the light emitting element 34 is charged to the second potential Vss.

Then, the horizontal selector 103 changes over the potential of the image signal line DTL10 to the reference potential Vofs at time $t_2$, and the write scanner 104 changes over the potential of the scanning line WSL10 to the high potential to turn on the sampling transistor 31 at time $t_3$. Consequently, the gate potential Vg of the driving transistor 32 becomes equal to the reference potential Vofs, and the gate-source voltage Vgs of the driving transistor 32 assumes the value of Vofs−Vss. Here, the value Vofs−Vss which is the gate-source voltage Vgs of the driving transistor 32 must be higher than the threshold voltage Vth, that is, Vofs−Vss>Vth must be satisfied, in order to carry out a threshold value correction operation within the next threshold value correction period $T_3$. Conversely speaking, the potentials Vofs and Vss are set so as to satisfy the condition of Vofs−Vss>Vth.

Figure 10:
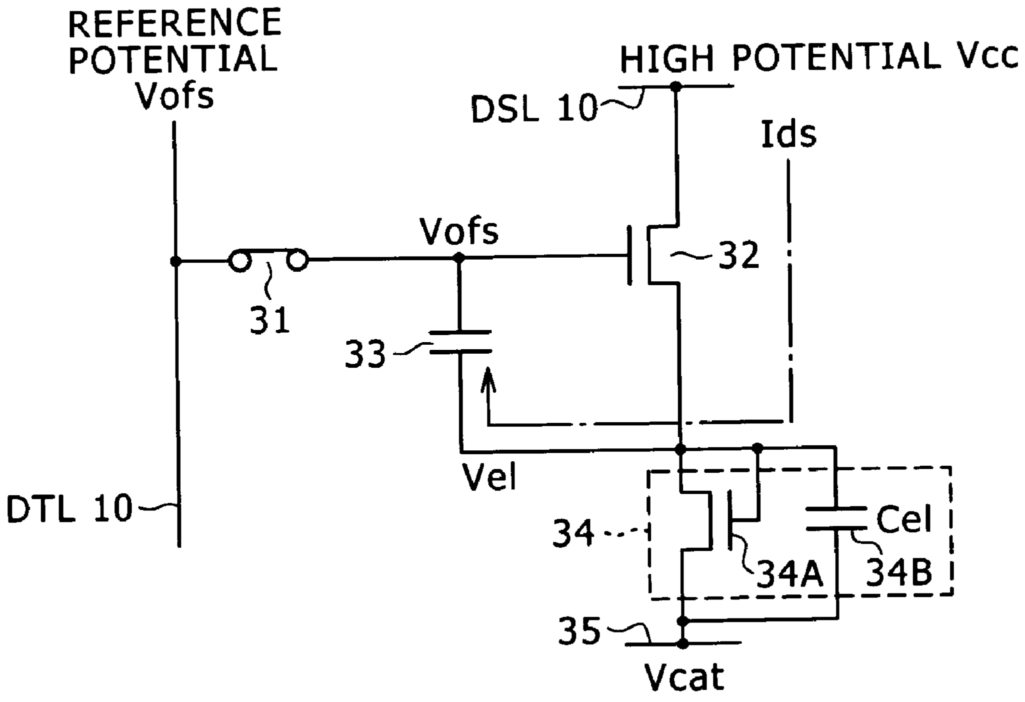
Figure 11:
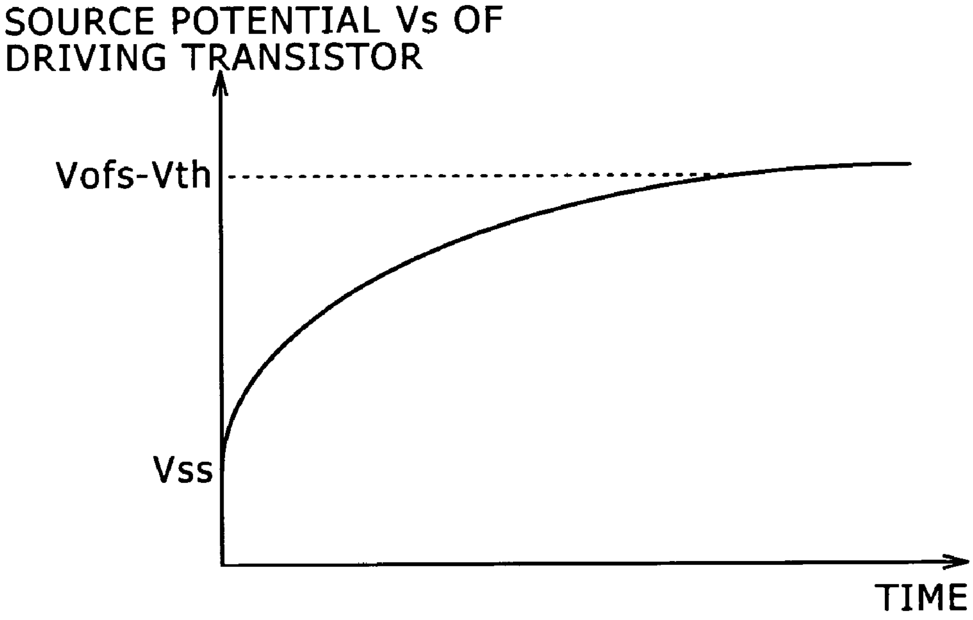
FIG. 11 is a graph illustrating a relationship between the source potential of a driving transistor and the time.

Then, at first time $t_4$ within the threshold value correction period $T_3$, the power supply scanner 105 changes over the potential of the power supply line DSL10 from the low potential Vss to the high potential Vcc as seen in FIG. 10. Consequently, that one of the terminals of the driving transistor 32 which is connected to the anode of the light emitting element 34 serves as the source s, and current flows as indicated by an alternate long and short dash line in FIG. 10.

Here, the light emitting element 34 can be represented equivalently by a diode 34A and a storage capacitor 34B having parasitic capacitance Cel, and in a condition that leak current of the light emitting element 34 is considerably lower than the current flowing through the driving transistor 32, that is, the condition of Vel ≦Vcat+Vthel is satisfied, the current flowing through the driving transistor 32 is used to charge the storage capacitors and 34B. The anode potential Vel of the light emitting element 34, that is, the source potential Vs of the driving transistor 32, rises in response to the current flowing through the driving transistor 32 as seen from FIG. 11. After a predetermined interval of time elapses, the gate-source voltage Vgs of the driving transistor 32 becomes equal to the threshold voltage Vth. Further, the anode potential Vel of the light emitting element 34 at this time is Vofs−Vth. Here, the anode potential Vel of the light emitting element 34 is lower than the sum of the threshold voltage Vthel and the potential Vcat of the light emitting element 34, that is, Vel=Vofs−Vth≦Vcat+Vthel.

Thereafter at time $t_5$, the potential of the scanning line WSL10 is changed over from the high potential to the low potential, and consequently, the sampling transistor 31 is turned off to complete the threshold value correction operation within the threshold value correction period $T_3$.

Figure 12:
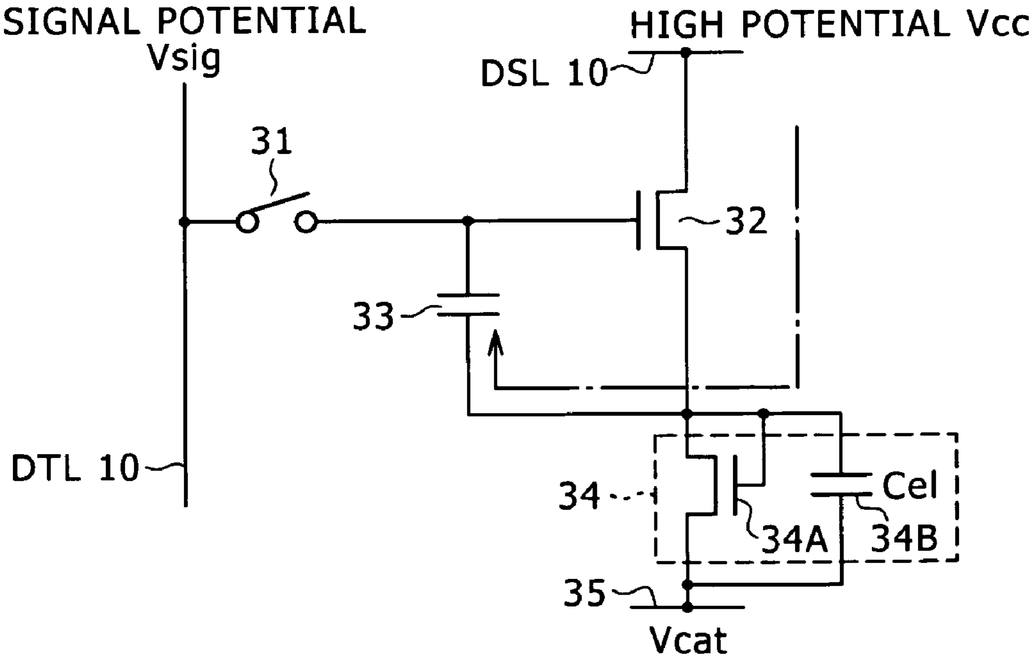
FIGS. 12 and 13 are circuit diagrams illustrating different operations in the operation of the pixel of FIG. 5 illustrated in FIG. 6.
Figure 13:
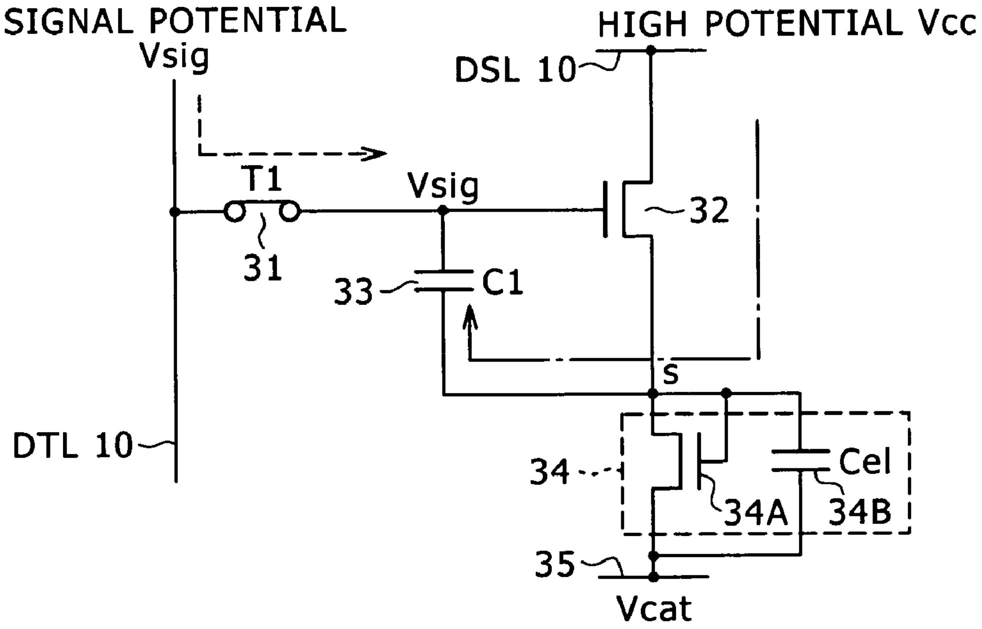

At time $t_6$ within the next writing+mobility correction preparation period $T_4$, the horizontal selector 103 changes over the potential of the image signal line DTL10 from the reference potential Vofs to the signal potential Vsig corresponding to a gradation as seen in FIG. 12, and thereafter, the writing+mobility correction period $T_5$ is entered. Within the writing+mobility correction period $T_5$, the potential of the scanning line WSL10 is set to the high potential at time $t_7$, and the sampling transistor 31 is turned on to carry out a writing operation of the image signal and a mobility correction operation as seen in FIG. 13. Since the sampling transistor 31 is on, the gate potential Vg of the driving transistor 32 becomes the signal potential Vsig. However, since current from the power supply line DSL10 flows to the sampling transistor 31, the source potential Vs of the driving transistor 32 rises as time passes.

The threshold value correction operation of the driving transistor 32 is completed already. Therefore, since the influence of the term for threshold value correction on the right side of the expression (1), that is, of the term of $(Vsig-Vofs)^2$, is eliminated, the current Ids supplied by the driving transistor 32 reflects the mobility μ. In particular, where the mobility μ is high, the current Ids supplied from the driving transistor 32 is high and also the source potential Vs rises rapidly as seen in FIG. 14. On the other hand, where the mobility μ is low, the current Ids supplied from the driving transistor 32 is low, and the source potential Vs rises but slowly. In other words, at a point of time after a fixed interval of time elapses, where the mobility μ is high, the rise amount $\Delta V_\mu$, that is, a potential correction value, for the source potential Vs of the driving transistor 32 is great, but where the mobility μ is low, the rise amount $\Delta V_\mu$, that is, a potential correction value, for the source potential Vs of the driving transistor 32 is small. Consequently, the dispersion of the gate-source voltage Vgs of the driving transistor 32 of each pixel 101 is reduced reflecting the mobility μ, and the gate-source voltage Vgs of the pixel 101 after the fixed interval of time elapses is fully free from the dispersion of the mobility μ.

Figure 15:
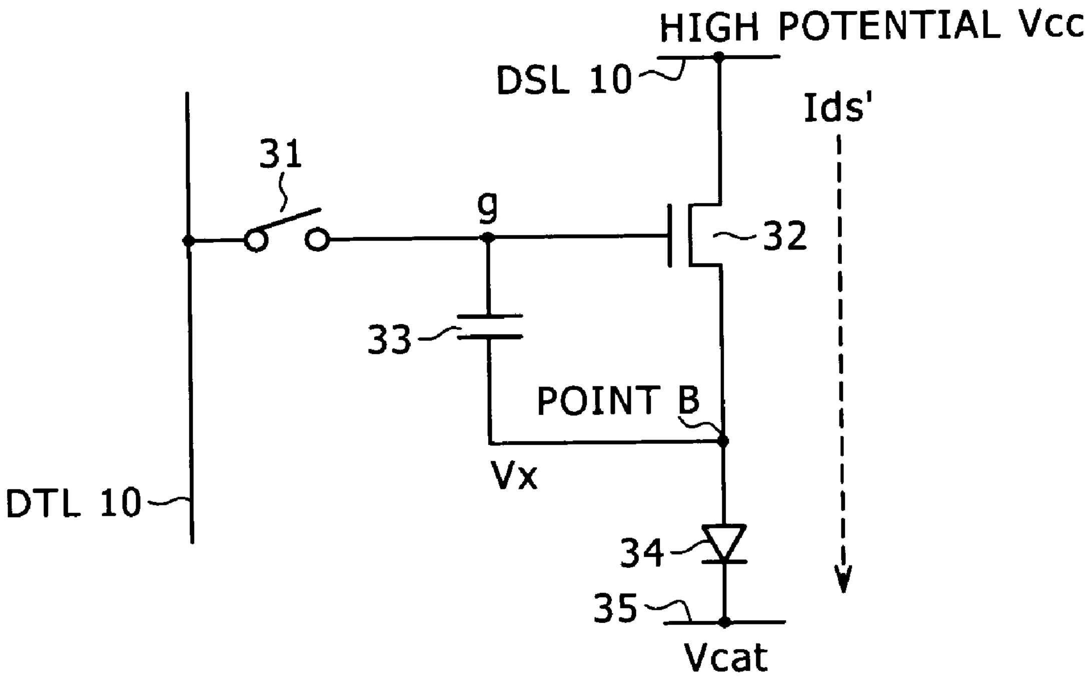
FIG. 15 is a graph illustrating another different operation in the operation of the pixel of FIG. 5 illustrated in FIG. 6.

At time $t_8$, the potential of the scanning line WSL10 is set to the low potential to turn off the sampling transistor 31, and consequently, the writing+mobility correction period $T_5$ ends and a light emitting period $T_6$ is started as seen in FIG. 15.

Within the light emitting period $T_6$, since the gate-source voltage Vgs of the driving transistor 32 is fixed, the driving transistor 32 supplies constant current Ids' to the light emitting element 34. Consequently, the anode potential Vel of the light emitting element 34 rises to a voltage $\tilde{V}x$ at which the constant current Ids' flows to the light emitting element 34, and the light emitting element 34 emits light. As the source potential Vs of the driving transistor 32 rises, also the gate potential Vg of the driving transistor 32 rises in an interlocking relationship by the bootstrap function of the storage capacitor 33.

Also in the pixel 101 for which the pixel 101*c* is adopted, the I-V characteristic of the light emitting element 34 varies as the light emitting time becomes long. Therefore, also the potential at a point B shown in FIG. 15 varies as time passes. However, since the gate-source voltage Vgs of the driving transistor 32 is kept at a fixed value, the current flowing to the light emitting element 34 does not vary. Accordingly, even if the I-V characteristic of the light emitting element suffers from aged deterioration, the constant current Ids' continues to flow, and therefore, the luminance of the light emitting element 34 does not vary.

In this manner, in the EL panel 100 of FIG. 5 which includes the pixel 101 (101*c*), the difference of the threshold voltage Vth and the mobility μ among the pixels 101 can be canceled by the threshold value correction function and the mobility correction function. Also the aged deterioration or secular change of the light emitting element 34 can be canceled.

Consequently, a display apparatus which uses the EL panel 100 of FIG. 5 can display an image with high picture quality.

However, where the configuration of the EL panel 100 of FIG. 5 is compared with the configuration of a liquid crystal display (LCD) apparatus, it can be considered that the LCD apparatus does not include a control line which corresponds to the power supply line DSL10 while the EL panel 100 includes a comparatively large number of control lines.

Figure 16:
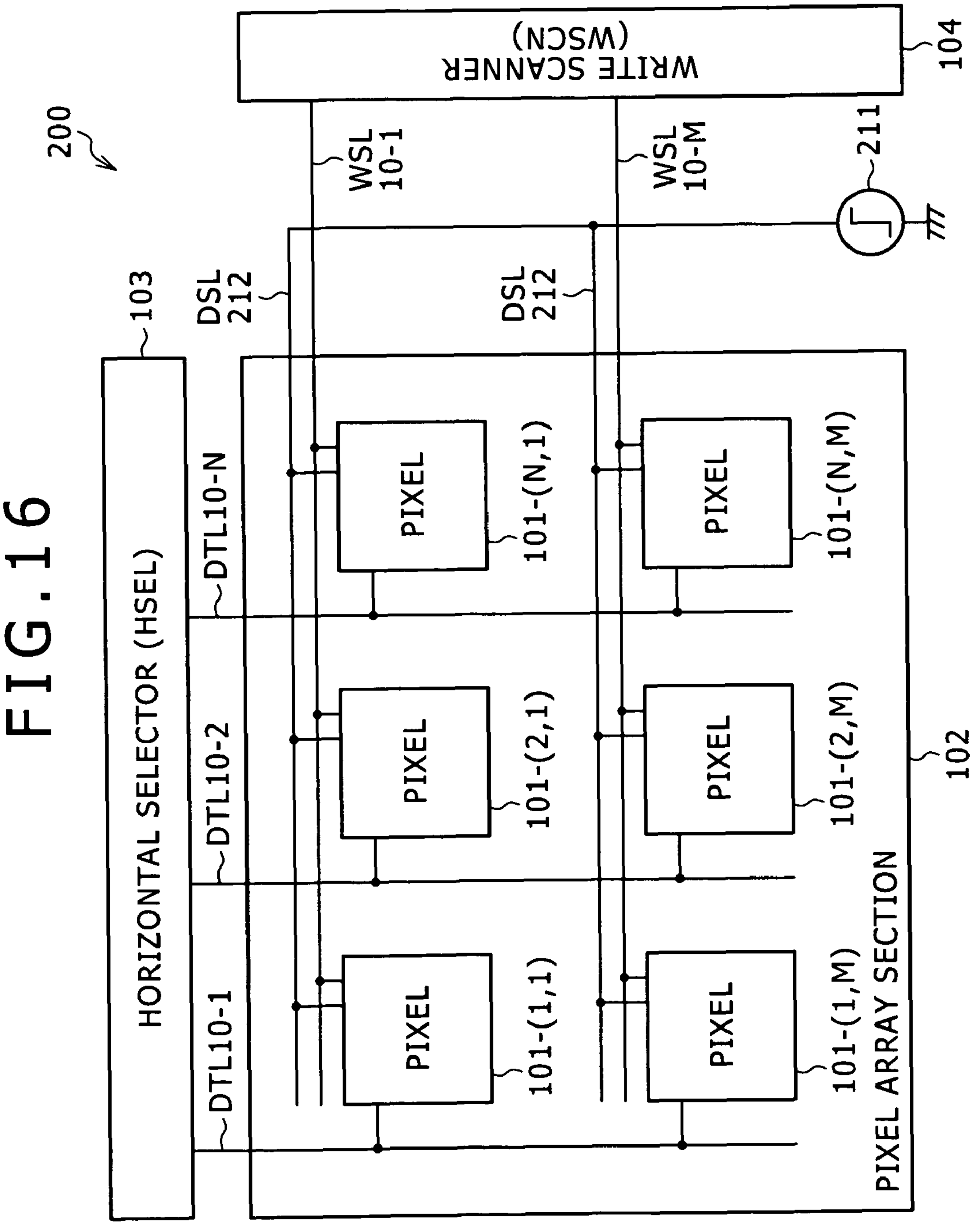
FIG. 16 is a block diagram showing an example of a configuration of an EL panel according to an embodiment of the present invention.

Therefore, as an EL panel which is further simplified in configuration and achieves further reduction in cost, an EL panel 200 is shown in FIG. 16.

In particular, FIG. 16 is a block diagram showing an example of a configuration of an EL panel according to a preferred embodiment of the present invention. It is to be noted that like elements to those of FIG. 1 are denoted by like reference characters and description thereof is omitted as occasion demands.

Referring to FIG. 16, the EL panel 200 shown is common in configuration to the EL panel 100 of FIG. 1 except that, in place of the power supply lines DSL10-1 to DSL10-M provided individually for the rows of the pixels 101, a power supply line DSL212 which is common to all of the pixels 101 is provided. Thus, a power supply voltage of the high potential Vcc as a first potential or the low potential Vss as a second potential is supplied equally to all of the pixels 101 from a power supply section 211 through the power supply line DSL212. In particular, the power supply section 211 carries out the same power supply potential control to all of the pixels 101 of the pixel array section 102.

In short, the EL panel 200 has a similar configuration to that of the EL panel 100 of FIG. 1 except the power supply section 211 and the power supply line DSL212. It is to be noted, however, that each of the pixels 101 of the pixel array section 102 has the configuration of the pixel 101*c* described hereinabove with reference to FIG. 5.

Figure 17:
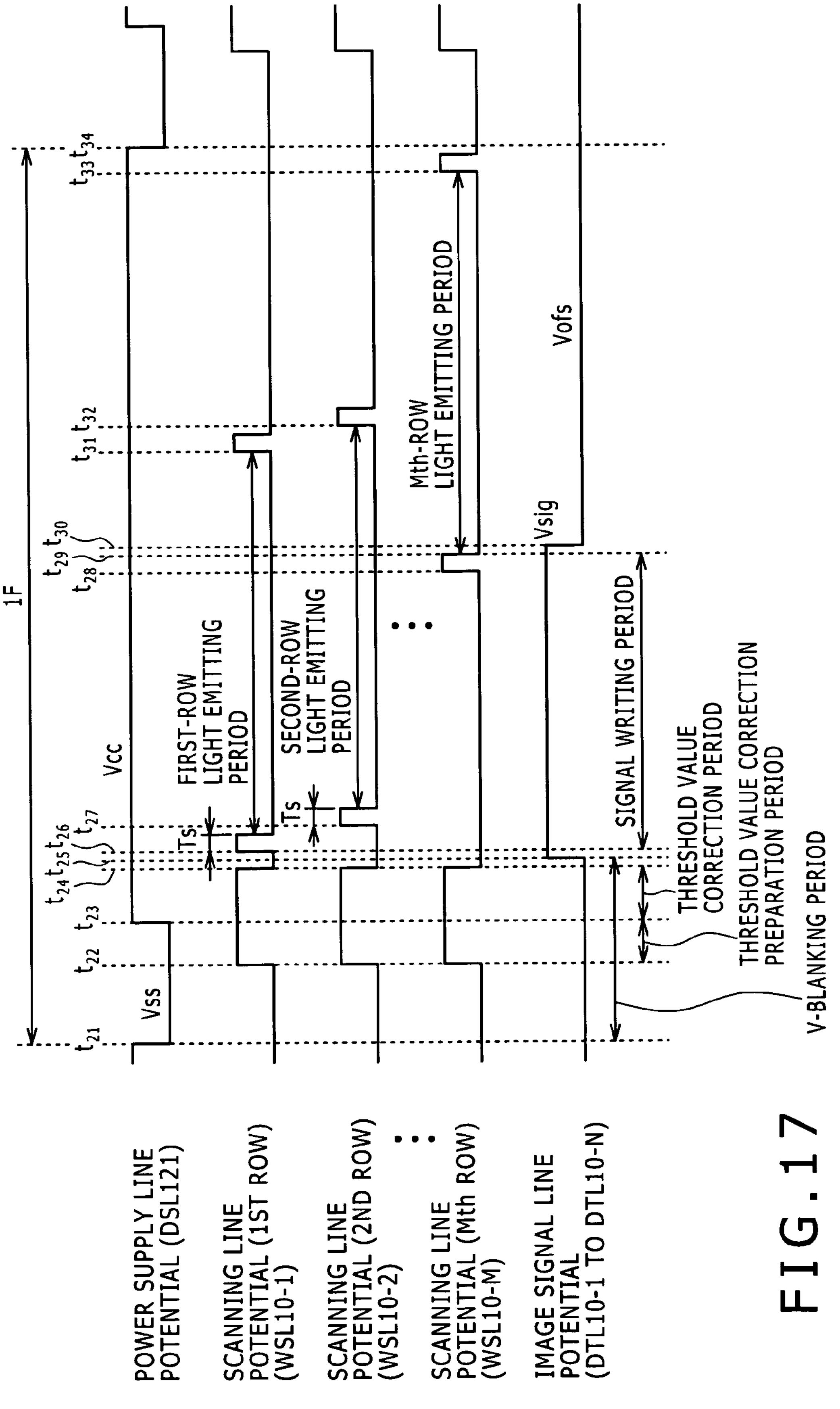
FIGS. 17 to 19 are timing charts illustrating first, second and third driving controlling methods for the EL panel of FIG. 16, respectively.

Now, a first driving controlling method adopted by the EL panel 200 is described with reference to FIG. 17. FIG. 17 illustrates timings at which a power supply voltage is supplied from the power supply section 211 to all pixels 101 through the power supply line DSL212 and light emission timings of the pixels 101 in the different rows.

Referring to FIG. 17, a period from time $t_{21}$ to time $t_{34}$ is a unit time period within which one image is to be displayed. The unit time period is hereinafter referred to as one-field period 1F. Within the one-field period 1F, a period from time $t_{21}$ to time $t_{25}$ is a vertical blanking period (V-blanking period). The period just described is hereinafter referred to as vertical blanking period. Further, a period from time $t_{25}$ to time $t_{34}$ is a line-sequential scanning period within which scanning of all pixels 101 is carried out line-sequentially.

First, at time $t_{21}$ within the vertical blanking period, the power supply section 211 changes over the potential to be supplied to the power supply line DSL212 from the high potential Vcc to the low potential Vss. It is to be noted that, at time $t_{21}$, the potentials of the scanning lines WSL10-1 to WSL10-M and the potentials of the image signal lines DTL10-1 to DTL10-N are set to the low potential side.

Then at time $t_{22}$, the write scanner 104 changes over the potential to be supplied to the scanning lines WSL10-1 to WSL10-M simultaneously to the high potential. Consequently, the gate potential Vg of the driving transistor 32 becomes equal to the reference potential Vofs and the source potential Vs of the driving transistor 32 becomes equal to the low potential Vss as described hereinabove with reference to FIG. 9. As a result, the gate-source voltage Vgs of the driving transistor 32 assumes a value of Vofs−Vss(>Vth) which is higher than the threshold voltage Vth of the driving transistor 32, and a threshold value correction preparation operation before threshold value correction is carried out is carried out. Accordingly, the period from time $t_{22}$ to time $t_{23}$ is a threshold value correction preparation period.

After the preparations for threshold value correction are completed, the power supply section 211 changes over the potential to be supplied to the power supply line DSL212 from the low potential Vss to the high potential Vcc to start a threshold value correction operation for all of the pixels 101 simultaneously at time $t_{23}$. In particular, as described hereinabove with reference to FIG. 10, the anode potential Vel of the light emitting element 34, that is, the source potential of the driving transistor 32, rises in response to the current flowing through the driving transistor 32, and after a predetermined period of time, the anode potential Vel becomes equal to Vofs−Vth. At time $t_{24}$, the potential to be supplied to the scanning lines WSL10-1 to WSL10-M is changed over at a time to the low potential by the write scanner 104, and the threshold value correction operation ends therewith.

Then, at time $t_{25}$, a line sequential scanning period within which an image signal is written line-sequentially into the pixels 101 is started.

In particular, within a period from time $t_{25}$ to time $t_{30}$, the potentials of the image signal lines DTL10-1 to DTL10-N are set to the signal potential Vsig corresponding to a gradation. Meanwhile, the write scanner 104 changes over the potential to be supplied in order or line-sequentially to the scanning lines WSL10-1 to WSL10-M to the high potential for a period of Ts. The light emitting elements 34 in the pixels 101 in the row for which the potential is changed over to the high potential for the period of time of Ts emit light.

It is to be noted that, since, while the potential of the scanning line WSL10 is set to the high potential, also the source potential Vs of the driving transistor 32 rises as described hereinabove with reference to FIG. 13, also mobility correction is carried out together with the writing of the image signal.

After the supply of the power supply potential of the high potential to the scanning line WSL10-M for the Mth row ends, the potentials of the image signal lines DTL10-1 to DTL10-N are changed over to the reference potential Vofs simultaneously at time $t_{30}$.

Then, in the state wherein the reference potential Vofs is supplied to the image signal lines DTL10-1 to DTL10-N, the write scanner 104 starts, at time $t_{31}$, changeover of the potential to be supplied to the scanning lines WSL10-1 to WSL10-M in order or line-sequentially to the high potential for a period of time of Ts. In the pixels 101 in the row for which the potential is changed over to the high potential for the period of time of Ts, the reference potential Vofs is supplied to the gate g of the driving transistor 32. Consequently, the gate-source voltage Vgs of the driving transistor 32 becomes lower than the threshold voltage Vth, and the light emitting element 34 stops the emission of light. Here, in order to cause the light emitting element 34 to stop the light emission, the potential to be supplied to the gate g of the driving transistor 32 need not necessarily be equal to the reference potential Vofs, but may be a potential lower than the sum of the potential Vcat of the light emitting element 34, threshold voltage Vthel of the light emitting element 34 and threshold voltage Vth of the driving transistor 32, that is, a potential lower than Vcat+Vthel+Vth. However, where the potential to be supplied is equal to the reference potential Vofs for threshold value correction, simple control can be achieved.

In the basic controlling method, the sampling transistor 31 is turned on in a state wherein the reference potential Vofs is supplied to the image signal line DTL10 to cause the light emitting element 34 to stop emission of light to control the light emitting period of each pixel row. Accordingly, the light emitting period is defined by turning off of the sampling transistor 31 in a state wherein the signal potential Vsig is supplied to the image signal line DTL10 and turning on of the sampling transistor 31 in another state wherein the reference potential Vofs is supplied to the image signal line DTL10. It is to be noted that, since it is necessary for the light emitting period to be same among the different rows, it is necessary for writing of an image signal for the Mth row which is the last row to be carried out prior by a period of time equal to the light emitting period to time at which a one-field period ends.

By providing the power supply line DSL212 commonly to all of the pixels and carrying out a threshold value correction preparation operation and a threshold value correction operation simultaneously or all at once for all pixels within the vertical blanking period, the circuit of the EL panel 200 can be simplified and power supply control can be facilitated. Therefore, the cost of the entire panel can be reduced.

Further, since a threshold value correction preparation operation and a threshold value correction operation are carried out within a vertical blanking period, the light emitting period can be assured long, which contributes to elongation of the life of the light emitting element.

Figure 18:
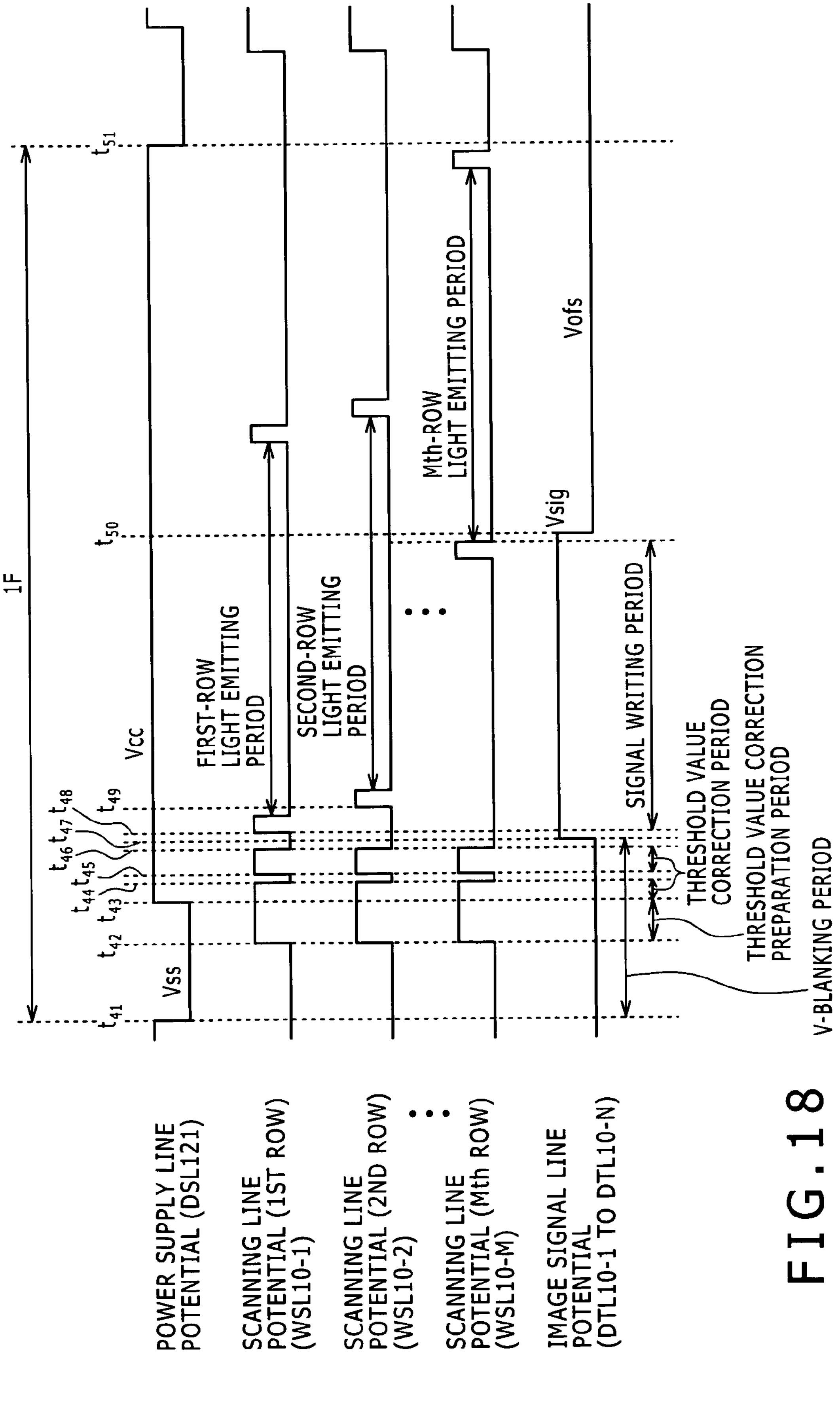

FIG. 18 illustrates a second driving controlling method by the EL panel 200.

It is known that, if a threshold value correction operation is carried out divisionally by a plural number of times, then the period of time until threshold value correction is completed, that is, the period of time until the gate-source voltage Vgs of the driving transistor 32 becomes equal to the threshold voltage Vth, decreases. Therefore, in the second driving controlling method illustrated in FIG. 18, the threshold value correction operation is executed divisionally twice.

In particular, in the first driving controlling method described hereinabove with reference to illustrated in FIG. 17, a threshold value correction operation is carried out once within a period from time $t_{23}$ to time $t_{24}$. However, in the second driving controlling method illustrated in FIG. 18, within a period from time $t_{44}$ to time $t_{45}$ from within a period from time $t_{43}$ corresponding to time $t_{23}$ of FIG. 17 to time $t_{46}$ which corresponds to time $t_{24}$ of FIG. 17, the potential of the scanning lines WSL10-1 to WSL10-M is changed over all at once to the low potential.

Consequently, threshold value correction is executed divisionally within a period from time $t_{43}$ to time $t_{44}$ and within another period from time $t_{45}$ to time $t_{46}$.

Accordingly, with the second driving controlling method, the time required for threshold value correction can be reduced from that by the first driving controlling method described above, and the light emitting period can be increased as much.

It is to be noted that the threshold value correction may be executed divisionally not twice but three or more times.

Operation within the period other than the vertical blanking period from time $t_{41}$ to time $t_{47}$ of FIG. 18 is similar to that of FIG. 17, and therefore, overlapping description of the operation is omitted herein to avoid redundancy.

In the methods described above with reference to FIGS. 17 and 18, until emission of light from the pixels 101 in the Mth row which is the last row is started, light emission from the pixels 101 in some other row which have started to emit light previously stops continues without fail. However, also such a case may possibly occur that it is desired to reduce the light emitting period in the rows such that, before light emission from the pixels 101 in the Mth row which is the last row is started, light emission from the pixels 101 in any other row which have started to emit light previously should be stopped. In such an instance, the EL panel 200 may adopt such driving control as illustrated in FIG. 19.

Figure 19:
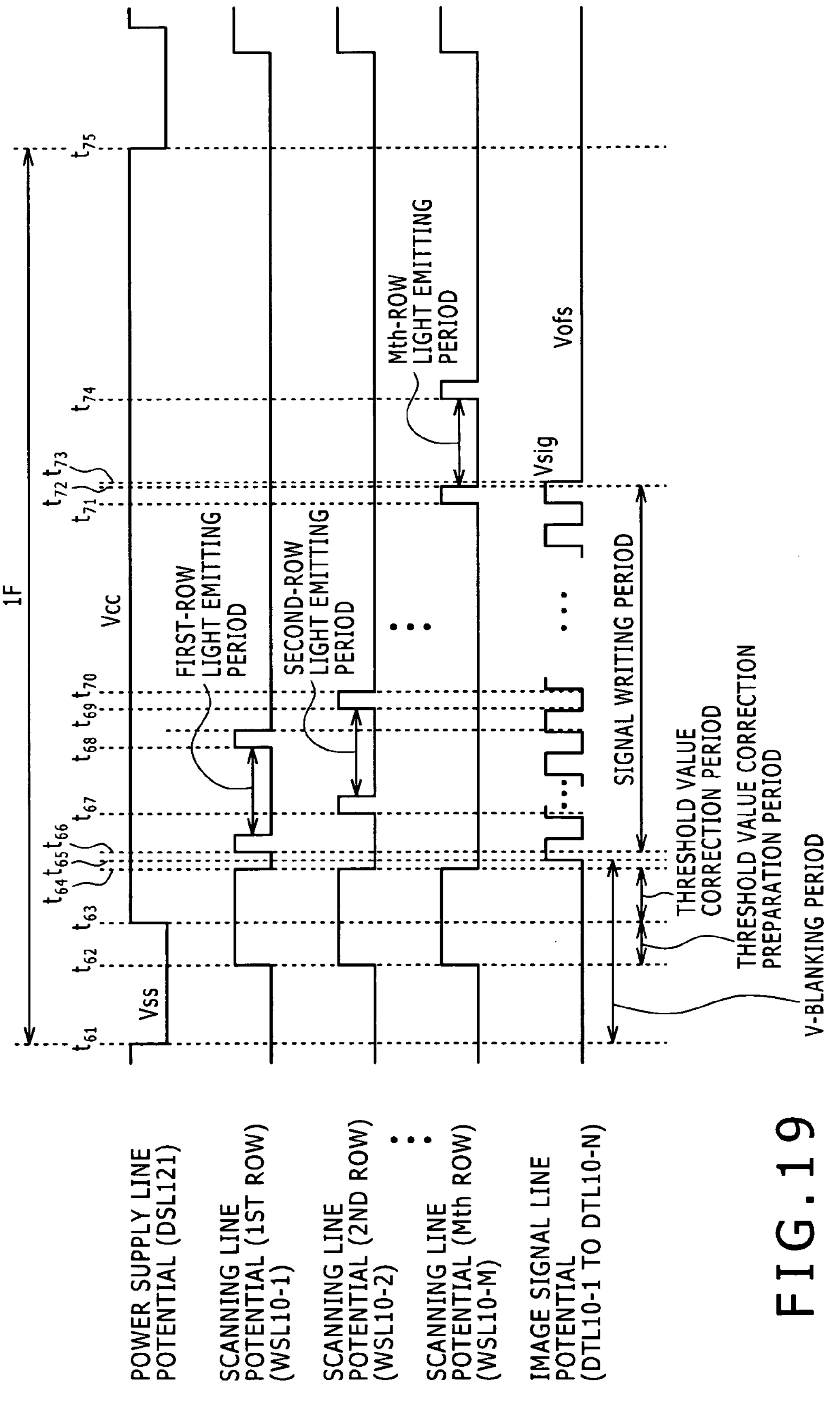

FIG. 19 illustrates a third driving controlling method by the EL panel 200.

Referring to FIG. 19, operation within a vertical blanking period from time $t_{61}$ to $t_{65}$ is similar to the operation within a vertical blanking period described hereinabove with reference to FIG. 17 and therefore, overlapping description of the operation is omitted.

Within a line-sequential scanning period, the sampling transistor 31 is turned on with the signal potential Vsig to cause the pixels 101 to emit light and the sampling transistor 31 is turned on with the reference potential Vofs to stop the emission of light from the pixels 101 similarly as in the first and second driving controlling methods. However, in the first and second driving controlling methods, the potential of the image signal line DTL10 does not become the reference potential Vofs before the pixels 101 in the last row are turned on to emit light. Consequently, before emission of light from the pixels 101 in the last row is started, the pixels 101 in any other row which have started to emit light previously cannot be turned off to stop the emission of light.

Therefore, in the third driving controlling method, the potential to be supplied from the horizontal selector 103 to the image signal line DTL10 is controlled so as to be alternately changed over between the signal potential Vsig and the reference potential Vofs in a short period. Then, in order to turn on the pixels 101 in a predetermined row to emit light, the write scanner 104 turns on the sampling transistor 31 when the potential of the image signal line DTL10 is the signal potential Vsig, but in order to turn off the pixels 101 in the predetermined row to stop the emission of light, the write scanner 104 turns on the sampling transistor 31 when the potential of the image signal line DTL10 is the reference potential Vofs. Further, the write scanner 104 controls the timing, at which the emission of light is to be stopped, so that the light emitting periods of the pixels in each row may be the same.

When some other control such as, for example, control to turn off the light emitting element 34 to stop emission of light is to be carried out within a line-sequential scanning period, the potential to be supplied to the gate g of the driving transistor 32 need not necessarily be the reference potential Vofs but may be any potential only if it is lower than the sum of the cathode potential Vcat of the light emitting element 34, the threshold voltage Vthel of the light emitting element 34 and the threshold voltage Vth of the driving transistor 32, that is, Vcat+Vthel+Vth. However, in the third driving controlling method, the potential to be supplied to the gate g of the driving transistor 32 described above is set to the reference potential Vofs for threshold value correction to facilitate the control similarly as in the first driving controlling method of FIG. 17. Also, in the third driving controlling method, it is necessary for image signal writing for the Mth row which is the last row to be carried out prior by the light emitting period to a point of time at which a one-field period ends similarly as in the first driving controlling method of FIG. 17.

In this manner, with the EL panel 200 of FIG. 16, since the power supply line DSL212 is used commonly to all pixels, the circuitry of the EL panel 200 is simplified and power supply control can be simplified. Therefore, reduction of the cost of the entire panel can be implemented.

Further, since a threshold value correction preparation operation and a threshold value correction operation are carried out within a vertical blanking period, the light emitting period can be assured long, which contributes to elongation of the life of the light emitting element. Further, where the threshold value correction operation is carried out divisionally by a plural number of times, the threshold value correction is completed earlier. Consequently, the light emitting period can be assured longer.

While a preferred embodiment of the present invention has been described using specific terms, such description is for illustrative purpose only, and it is to be understood that changes and variations may be made without departing from the spirit or scope of the following claims.

The present application contains subject matter related to that disclosed in Japanese Priority Patent Application JP 2008-092184, filed in the Japan Patent Office on Mar. 31, 2008, the entire content of which is hereby incorporated by reference.

What is claimed is:

1. A panel, comprising:

a plurality of pixel circuits disposed in rows and columns and each including a light emitting element configured to emit light in response to driving current, a sampling transistor configured to sample an image signal, a driving transistor configured to supply the driving current to the light emitting element, and a storage capacitor configured to store a predetermined potential;

a power supply scanner configured to supply a predetermined power supply voltage to the plurality of pixel circuits disposed in rows and columns; and a power supply line for connecting to all of the plurality of pixel circuits disposed in rows and columns and the power supply scanner to each other wherein the power supply scanner carries out power supply voltage control for all of the plurality of pixel circuits disposed in rows and columns in order to carry out a threshold value correction preparation operation and a threshold value correction operation simultaneously for all of the plurality of pixel circuits disposed in rows and columns within a vertical blanking period.

2. The panel according to claim 1, further comprising:

a scanning controller configured to turn on and off the sampling transistor in each of the plurality of pixel circuits to control a light emitting period of the light emitting element.

3. The panel according to claim 2, wherein the potential supplied to a gate of the driving transistor when the scanning controller turns on the sampling transistor in order to control the light emitting element to stop the emission of light is lower than the sum of a cathode voltage of the light emitting element, a threshold voltage of the light emitting element and a threshold voltage of the driving transistor.

4. The panel according to claim 2, wherein the potential supplied to a gate of the driving transistor when the scanning controller turns on the sampling transistor in order to control the light emitting element to stop the emission of light is equal to a reference potential for the threshold value correction operation.

5. The panel according to claim 1, wherein the threshold value correction operation is executed divisionally by a plural number of times.

6. A driving controlling method for a panel which includes a plurality of pixel circuits disposed in rows and columns and each including a light emitting element for emitting light in response to driving current, a sampling transistor for sampling an image signal, a driving transistor for supplying the driving current to the light emitting element, and a storage capacitor for storing a predetermined potential, comprising the step of:

carrying out power supply voltage control for all of the plurality of pixel circuits through a common power supply line connected to all of the plurality of pixel circuits in order to carry out a threshold value correction preparation operation and a threshold value correction operation simultaneously for all of the plurality of pixel circuits disposed in rows and columns within a vertical blanking period.

7. The driving controlling method according to claim 6, wherein the step further comprises turning, by a scanning controller, on and off the sampling transistor in each of the plurality of pixel circuits to control a light emitting period of the light emitting element.

8. The driving controlling method according to claim 7, wherein the turning further comprises supplying the potential, which is lower than the sum of a cathode voltage of the light emitting element, a threshold voltage of the light emitting element and a threshold voltage of the driving transistor, to a gate of the driving transistor when the scanning controller turns on the sampling transistor.

9. The driving controlling method according to claim 7, wherein the turning further comprises Supplying the potential equal to a reference potential for the threshold value correction operation to a gate of the driving transistor when the scanning controller turns on the sampling transistor.

* * * * *